Feb. 11, 1969     B. SCHOMAKER     3,426,854

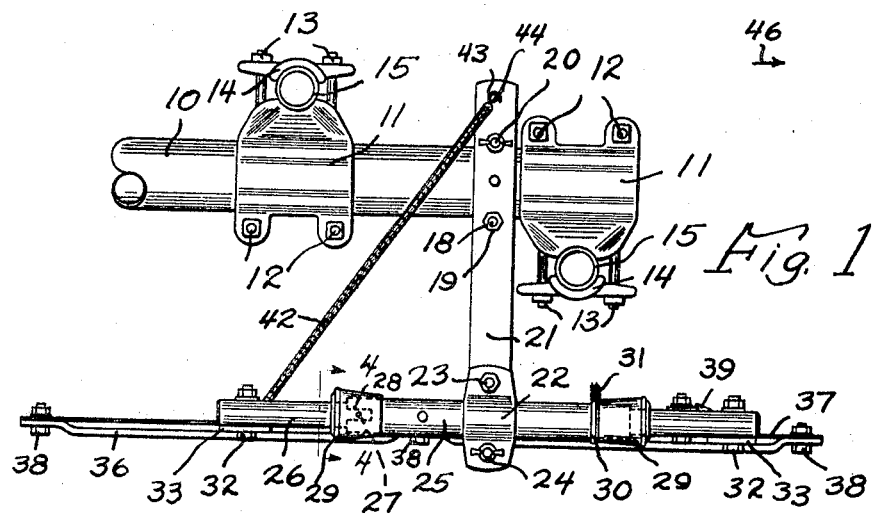
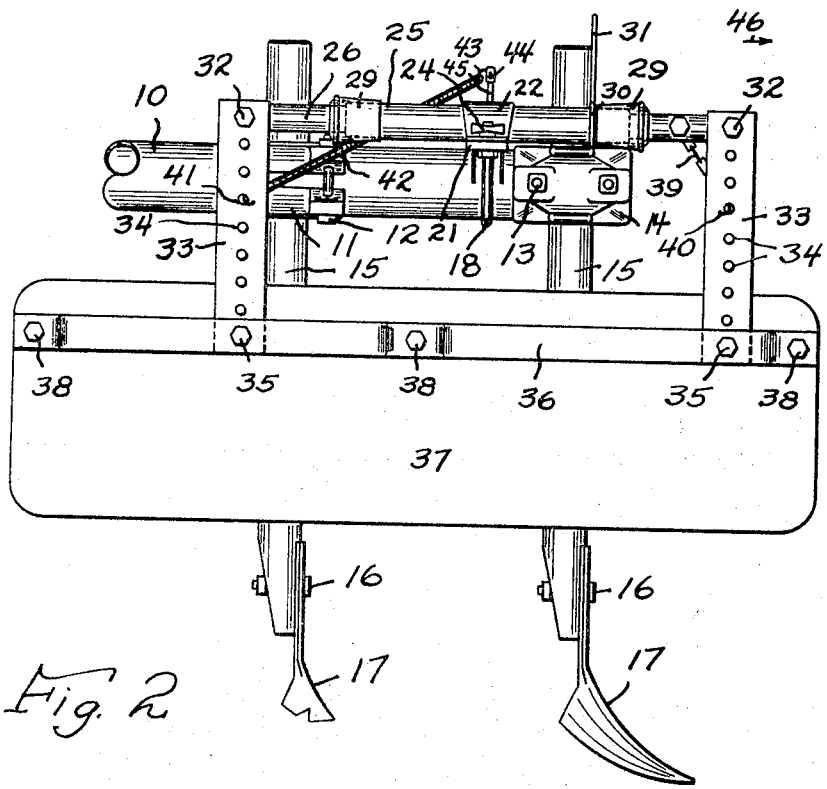

SELF-CLEANING ADJUSTABLE CULTIVATOR SHIELD

Filed Oct. 1, 1965

INVENTOR.
Bill Schomaker
BY
Sam J. Slotsky
ATTORNEY

United States Patent Office 3,426,854
Patented Feb. 11, 1969

3,426,854
SELF-CLEANING ADJUSTABLE CULTIVATOR SHIELD
Bill Schomaker, Sioux Rapids, Iowa 50585
Filed Oct. 1, 1965, Ser. No. 492,075
U.S. Cl. 172—509
Int. Cl. *A01b 17/00; A01c 5/04*
4 Claims

ABSTRACT OF THE DISCLOSURE

A shield for a farm cultivator being useable with nearly any type of such machine. Said shield is attached to the cultivator and is provided with a mounting which allows limited lateral movement relative to the cultivator and is resiliently held against said movement resulting in a shield which is self-cleaning.

---

My invention relates to a self-cleaning adjustable cultivator shield.

An object of my invention is to provide a shield for cultivators which will be resiliently supported, so that as the cultivator shovels or similar units pass through the field, the earth will be allowed to pass freely between the shield and the cultivator members.

A further object of my invention is to provide means for adjusting the cultivator shield spatially with respect to the cultivator members.

A further object of my invention is to provide means for adjustably securing the shield in any pre-selected position.

A further object of my inveniton is to provide means for allowing raising of the shield vertically.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a plan view of the device of my invention,

FIGURE 2 is a side elevation of FIGURE 1,

Figure 3:
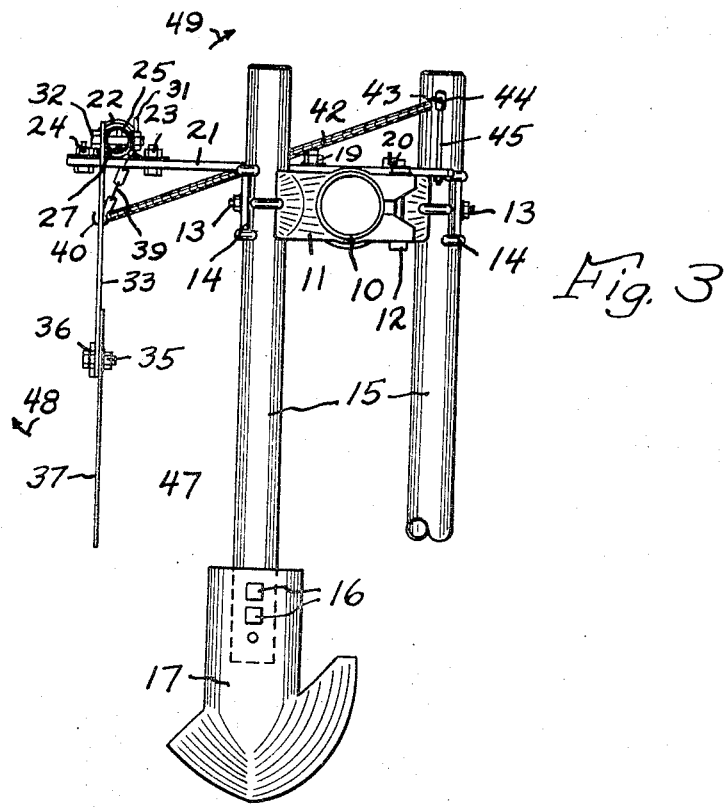
FIGURE 3 is an end view of FIGURE 1.
Figure 4:
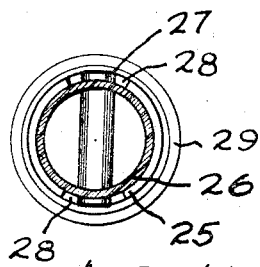
FIGURE 4 is an enlarged sectional detail taken along the lines 4—4 of FIGURE 1.

My invention contemplates the provision of a shield member positioned adjacently to a cultivator and which shield member will not become clogged by the soil, etc., as the cultivator passes through the field and will have the desirable characteristics of being self-cleaning, said shield also being adjustable.

In describing my invention, I have used the character 10 to designate a tubular member which is suitably supported by a tractor which carries the cultivator members and shields, in many cases there being eight of such units or less depending upon the number of rows to be cultivated, and I have further used the character 11 to designate a pair of clamps which are clamped to the member 10 by means of the bolts 12, the clamps 11 being also clamped as at 13 to the further clamp members 14 which receive the vertical tubes 15 which tubes are attached as at 16 to the cultivator blades 17.

Passing about the member 10 is a U bolt 18 secured by the nut 19 and the wing nut 20 to a flat strap 21, the strap 21 being secured to the bearing member 22 by means of the nut and bolt 23 and the wing nut arrangement at 24. The clamp member 22 is adapted to tightly secure the tube 25, and received within the tube 25 is a further tube 26, the tube 26 including a pin 27 attached thereto, the pin 27 being received in the open slots 28 which slots are provided in the outer tube 25.

The character 29 indicates a pair of longitudinally slidable sleeves, one of said sleeves covering the slots 28, and securely attached to the outer tube 25 is a U bolt 30 which is attached to a lever 31, and pivoted as at 32 to the inner tube 26 are the straps 33 having the openings 34 therein, these straps also being pivotally attached at 35 to the further strap 36 and the shield 37, the shield being made of a flat piece of relatively thin material such as steel or the like, the character 38 indicating suitable bolts for securing the strap 36 to the shield, the straps 33 being freely pivoted between the strap 36 and the shield.

The character 39 indicates a chain attached to the tube 26, the chain 39 being attached to a hook 40 which can be received in any of the openings 34 for supporting the forward end of the unit or if it is desired to support the shield in an angular position, etc.

Attached to one of the straps 33 by means of the hook 41 in any of the openings 34 is a coiled helical spring 42 which is attached to a further hook 43 which is suitably attached as at 44 to a post 45, which post is secured to the strap 21.

The device operates in the following manner.

As the tractor travels forwardly in the direction of the arrow 46, it will be noted that the shield 37 is resiliently held by means of the spring 42, and any of the hard lumps of soil and the like passing between the shield 37 and the shovel 17 in the space 47, will cause the shield 37 to swing in the direction of the arrow 48 thereby allowing release of the soil past the shield so that in this way it will be impossible for clogging to occur, and the effect will be to maintain the shield in a clean condition at all times during the use thereof. After the soil passes through, the spring will bring the shield back to the normally vertical position shown.

When it is desired to adjustably place the shield 37 closer to the shovel 17, the wing nut 20 is loosened, which will allow the strap 21 to be moved in the direction of the arrow 49, and the wing nut 24 is also then loosened so that the outer tube 25 can be rotated within the bearing 22 to bring the shield 37 to vertical position again. After the adjustment is made the wing nuts are tightened. It will be noted that the pins 27 will be able to rock back and forth within the slots 28 during any movement of the shield 37 and by rotating the outer tube 25 as explained, the slots 28 can always be adjustably positioned upwardly to the positions shown in FIGURE 1 by means of rotating the member 25 as above described. The lever 31 can be used to provide means for rotating the outer tube 25.

The sleeves 29 can be slipped off the end of the outer tube for inspection purposes, etc., and it will be noted from FIGURE 2 especially that the shield 37 can freely swing rearwardly, etc., due to the pivotal connections at 32 and 35 to provide flexibility to the arrangement. Also, the pivoting points at 35 can be vertically adjusted by means of the openings 34. In many cases when the shield is not used, it can be swung to an upper position as described and reset, it being noted that the adjustable arrangements mentioned will provide for any desired type of adjustment consistent with the operation of the device. The hook at 43 can be detached when desired.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a cultivator and the support for the same, a normally vertically positioned shield member spaced from said cultivator, a bracket for supporting said shield member, said bracket being attached to said support member, means for pivotally securing said shield member to said bracket for limited lateral movement relative to said cultivators, resilient means attached between said shield member and said bracket, said pivotally securing means including an outer tube, an inner tube received in said outer tube and secured to said shield member, said outer tube fixedly secured to said bracket and having arcuate slots therein, and a pin attached to said inner tube received in said slots.

2. In combination with a cultivator and the support for the same, a normally vertically positioned shield member spaced from said cultivator, a bracket for supporting said shield member, said bracket being attached to said support member, means for pivotally securing said shield member to said bracket for limited movement relative to said cultivator, resilient means attached between said shield member and said bracket, said pivotally securing means including an outer tube, an inner tube received in said outer tube and secured to said shield member, said outer tube having arcuate slots therein, a pin attached to said inner tube received in said slots, a securing member attached to said bracket adapted to secure said outer tube in fixed position, means for loosening said securing means for adjustably rotating said outer tube.

3. In combination with a cultivator and the support for the same, a normally vertically positioned shield member spaced from said cultivator, a bracket for supporting said shield member, said bracket being attached to said support member, means for pivotally securing said shield member to said bracket for limited movement relative to said cultivator, resilient means attached between said shield member and said bracket, said pivotally securing means including an outer tube, an inner tube received in said outer tube and secured to said shield member, said outer tube having arcuate slots therein, a pin attached to said inner tube received in said slots, a securing member attached to said bracket adapted to secure said outer tubes in fixed position, means for loosening said securing means for adjustably rotating said outer tube, means for adjustably securing said bracket member to said support member.

4. In combination with a cultivator and the support for the same, a normally vertically positioned shield member spaced from said cultivator, a bracket for supporting said shield member, said bracket being attached to said support member, means for pivotally securing said shield member to said bracket, resilient means attached between said shield member and said bracket for limited movement relative to said cultivator, said pivotally securing means including an outer tube, an inner tube received in said outer tube and secured to said shield member, said outer tube having arcuate slots therein, a pin attached to said inner tube received in said slots, a securing member attached to said bracket adapted to secure said outer tube in fixed position, means for loosening said securing means for adjustably rotating said outer tube, means for adjustably securing said bracket member to said support member, vertically positioned straps pivotally secured to said inner tube and to said shield member, said straps having a plurality of vertically spaced openings for providing adjustable pivoting of said shield member.

References Cited
UNITED STATES PATENTS

| | | | |
|---|---|---|---|
| 1,267,425 | 5/1918 | Larson | 172—513 |
| 1,573,712 | 2/1926 | Hunt | 172—513 |
| 1,590,941 | 6/1926 | Hamblin | 172—509 |
| 1,674,666 | 6/1928 | Seaholm | 172—509 |
| 3,157,139 | 11/1964 | Spindler | 111—85 |

ABRAHAM G. STONE, *Primary Examiner.*

W. J. CONLON, *Assistant Examiner.*

U.S. Cl. X.R.

111—85